US011278882B2

(12) United States Patent
Day

(10) Patent No.: US 11,278,882 B2
(45) Date of Patent: Mar. 22, 2022

(54) VIBRATING A DISPENSE HEAD TO MOVE FLUID

(71) Applicant: HEWLETT-PACKARD DEVELOPMENT COMPANY, L.P., Houston, TX (US)

(72) Inventor: Michael J Day, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 451 days.

(21) Appl. No.: 16/099,962

(22) PCT Filed: Jul. 27, 2016

(86) PCT No.: PCT/US2016/044236
§ 371 (c)(1),
(2) Date: Nov. 8, 2018

(87) PCT Pub. No.: WO2018/022036
PCT Pub. Date: Feb. 1, 2018

(65) Prior Publication Data
US 2019/0134623 A1 May 9, 2019

(51) Int. Cl.
*B01L 3/02* (2006.01)
*B05B 3/14* (2006.01)
*B05B 17/00* (2006.01)
*G01N 35/10* (2006.01)
*B01L 3/00* (2006.01)
*G01N 35/00* (2006.01)

(52) U.S. Cl.
CPC ....... *B01L 3/0268* (2013.01); *B01L 3/502715* (2013.01); *B05B 3/14* (2013.01);
(Continued)

(58) Field of Classification Search
CPC ............ B01L 3/0268; B01L 3/502715; B01L 2200/027; B01L 2300/021;
(Continued)

(56) References Cited

U.S. PATENT DOCUMENTS

| 5,543,827 A | 8/1996 | Vansteenkiste et al. |
| 5,757,396 A | 5/1998 | Bruner |

(Continued)

FOREIGN PATENT DOCUMENTS

| EP | 0493102 A1 | 12/1991 |
| EP | 0580283 A2 | 1/1994 |

(Continued)

OTHER PUBLICATIONS

Tandiono et al., "Creation of Cavitation Activity in a Microfluidic Device Through Acoustically Driven Capillary Waves," Lab on a Chip, May 7, 2010.

*Primary Examiner* — Jennifer Wecker
*Assistant Examiner* — Oyeleye Alexander Alabi
(74) *Attorney, Agent, or Firm* — Dicke Billig & Czaja PLLC

(57) ABSTRACT

In an example implementation, a method of dispensing fluid from a fluid dispensing device, includes receiving a dispense head at a receiving station, and receiving a notification that a supply slot in the dispense head has been filled with fluid. The method includes vibrating the dispense head to move fluid through a microfluidic channel from the supply slot into an ejection chamber of the dispense head, and providing a dispense signal to cause an ejection mechanism disposed within the chamber to eject an amount of the fluid from the dispense head.

20 Claims, 4 Drawing Sheets

(52) U.S. Cl.
CPC ... *B05B 17/0646* (2013.01); *G01N 35/00732* (2013.01); *G01N 35/1002* (2013.01); *B01L 2200/027* (2013.01); *B01L 2300/021* (2013.01); *B01L 2300/0681* (2013.01); *B01L 2300/0864* (2013.01); *B01L 2400/0433* (2013.01); *B01L 2400/0439* (2013.01); *B01L 2400/0442* (2013.01); *G01N 2035/00811* (2013.01); *G01N 2035/1041* (2013.01)

(58) Field of Classification Search
CPC ..... B01L 2300/0681; B01L 2300/0864; B01L 2400/0433; B01L 2400/0439; B01L 2400/0442; B05B 3/14; B05B 17/0646; G01N 35/00732; G01N 35/1002; G01N 2035/00811; G01N 2035/1041
See application file for complete search history.

(56) References Cited

U.S. PATENT DOCUMENTS

| | | |
|---|---|---|
| 6,861,034 B1 | 3/2005 | Elrod et al. |
| 8,931,880 B2 | 1/2015 | Murphy et al. |
| 2006/0100311 A1 | 5/2006 | Tokuda et al. |
| 2008/0281471 A1 | 11/2008 | Smith |
| 2010/0265287 A1* | 10/2010 | Govyadinov ........ B41J 2/04586 347/9 |
| 2011/0141191 A1* | 6/2011 | Folkers ................ B41J 2/04581 347/27 |
| 2013/0143328 A1 | 6/2013 | Peters |
| 2013/0314465 A1 | 11/2013 | Lebron et al. |
| 2014/0012225 A1 | 1/2014 | Yoo et al. |
| 2014/0017150 A1 | 1/2014 | Wang et al. |
| 2016/0195524 A1* | 7/2016 | Cowan ................. B01L 3/5027 506/9 |

FOREIGN PATENT DOCUMENTS

| | | |
|---|---|---|
| GB | 1519627 A | 8/1978 |
| WO | WO-1999047355 A1 | 9/1999 |
| WO | WO-1999047356 A1 | 9/1999 |
| WO | WO-2016042722 A1 | 3/2016 |
| WO | WO-2016078340 A1 | 5/2016 |

* cited by examiner

VIBRATING A DISPENSE HEAD TO MOVE FLUID

BACKGROUND

Fluid dispensing systems have applicability within a wide range of industries, including pharmaceutical, life science research, medical, printing, electronics manufacturing, and other industries. Manual fluid dispensing systems such as pipettes are increasingly being replaced by automated pipetting or fluid dispensing systems that can provide a high degree of accuracy and repeatability with improved dispense throughput. Industries can employ such automated, precision fluid dispensing systems for a variety of purposes, including for the preparation of biological and pharmaceutical assays, the delivery of fluid ink drops to various print media, the dispensing of adhesive materials in an accurate and repeatable manner, and so on.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
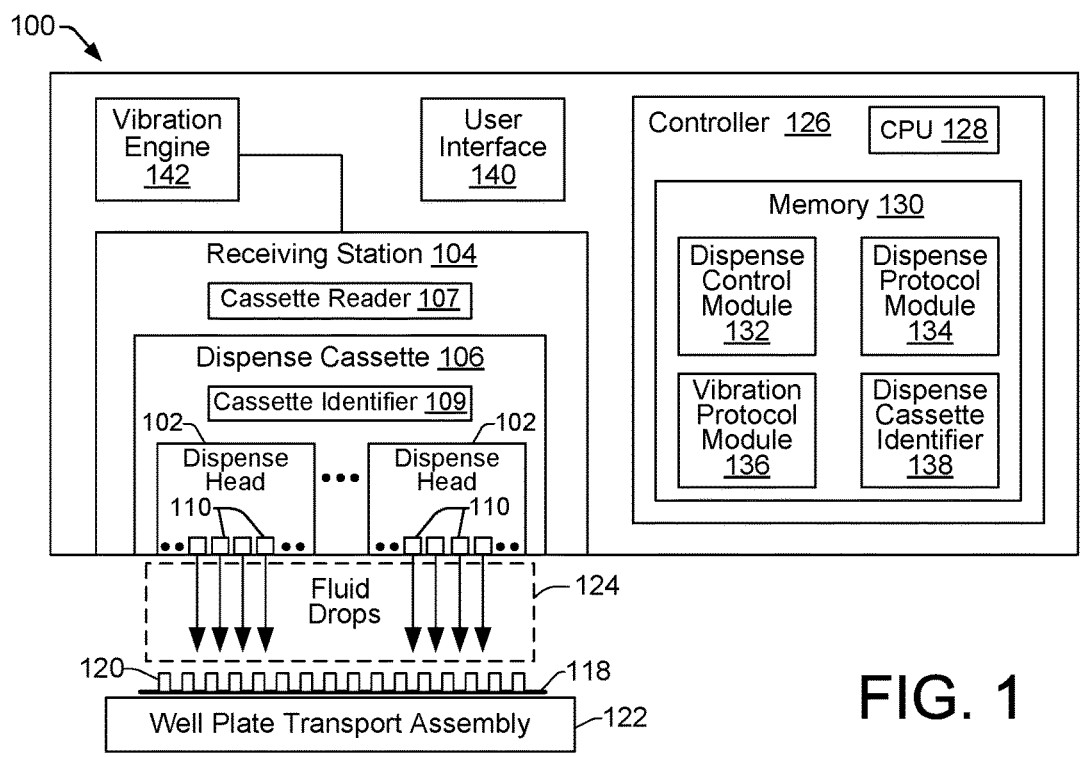
FIG. 1 shows an example of a fluid dispensing device suitable for implementing vibrational priming of a microfluidic dispense head.

In some examples of fluid dispensing systems, microfluidic devices can be leveraged to deliver small drops of fluids on the order 10 picoliters per drop. For example, the ability to dispense smaller drops in applications such as drug testing can help to preserve scarce materials while enabling more accurate determinations of doses and concentrations of drugs that can react with diseased cells.

One challenge in the design and use of microfluidic devices in fluid dispensing systems is how to get the fluid to move freely into and through the devices, which can include microchannels and other structures whose dimensions are measured in microns. High surface tension and/or poor wetting properties of a fluid can prevent the fluid from moving into and through the microchannels and other microstructures. This can cause delays in wetting the inside surfaces within a microfluidic device and/or priming the device with fluid, which can interfere with some fluid dispensing applications.

In some examples, surfactants and various agents can be added to the fluid to reduce its surface tension and/or improve its wettability. In some examples, positive or negative (vacuum) pressure can also be used to move fluid into and throughout the microfluidic device. However, the addition of such adjuncts to the fluid is often undesirable as they can sometimes impact the operability of the fluid and/or the testing of the fluid. For example, in some aqueous bio-print applications, surfactants and other agents can be incompatible with the biological materials being dispensed. Similarly, the application of pressure to move fluid through the microfluidic device is often impractical due to design and/or application specific constraints.

Accordingly, in some examples described herein, a fluid dispensing device and related methods cause the movement of fluid into an throughout the microchannels, microchambers, and other microstructures within a microfluidic dispense head through the application of a high frequency vibration to the dispense head. The high frequency vibration helps to overcome the surface tension and poor wetting properties of fluids. The vibration causes fluids whose properties might otherwise prevent the fluid from flowing into microchannels and other microstructures, to flow into and fill the channels and chambers of the dispense head. Vibrational priming of the dispense head in this manner enables operation of the dispense head without having to add surfactant or adjuncts to the fluid, or apply negative or positive pressure to the fluid.

In a particular example, a method of dispensing fluid from a fluid dispensing device includes receiving a dispense head at a receiving station. In some examples the dispense head comprises a dispense cassette that includes multiple dispense heads. The method includes receiving a notification, such as from a user through a user interface, that a supply slot within the dispense head has been filled with fluid. The method then includes vibrating the dispense head to move fluid through a microfluidic channel from the supply slot into an ejection chamber of the dispense head. A dispense or eject signal is then provided to cause an ejection mechanism disposed within the chamber to eject an amount of fluid from the dispense head. The ejection mechanism is not related to the vibration of the dispense head, but instead can include, for example, the heating of a thermal resistor element within the chamber to form a vapor bubble that forces fluid from the head, or the stimulation of a piezoelectric membrane to generate a pressure wave within the chamber that forces fluid from the head.

In another example, a fluid dispensing device includes a receiving station to receive a dispense head. In some examples the dispense head comprises a dispense cassette that includes multiple dispense heads. The dispense head includes a supply slot to receive fluid, an ejection mechanism to eject portions of the fluid from a chamber through a nozzle, and a microfluidic channel that provides fluid communication between the slot and the chamber. The fluid dispensing device also includes a vibration device to vibrate the dispense head in the receiving station, causing fluid to move from the slot into the chamber through the microfluidic channel.

In another example, a non-transitory machine-readable storage medium stores instructions that when executed by a processor of a fluid dispensing device cause the device to determine a type of a fluid dispense head that has been installed in the fluid dispensing device. In some examples, the dispense head comprises a dispense cassette that includes multiple dispense heads. The instructions further cause the fluid dispensing device to access a vibration protocol associated with the type of fluid dispense head, and to vibrate the fluid dispense head according to the vibration protocol. The fluid dispensing device then activates an ejection mechanism within a fluidic chamber of the fluid dispense head to eject fluid from the fluid dispense head.

FIG. 1 shows an example of a fluid dispensing device 100 suitable for implementing vibrational priming of a microfluidic dispense head 102 to ensure that microchannels, microchambers, and other microstructures are filled with fluid prior to beginning fluid dispensing. While the fluid dispensing device 100 is illustrated and described herein in terms of a digital fluid dispenser useful in pharmaceutical, biological, and other life science research, for example, in testing drug dose responses, independent titrations, and for other low-volume dispensing, it is to be understood that the described mechanisms and concepts can apply in a similar manner to other fluid dispensing devices. For example, vibrational priming as described herein is applicable to various inkjet printing systems in which microfluidic printheads operate to eject inks and other fluids onto print media.

Referring to FIG. 1, an example fluid dispensing device 100 can include a receiving station 104 to receive a microfluidic dispense head 102. As shown in FIG. 1, in some examples a receiving station 104 can receive a dispense cassette 106 that comprises multiple microfluidic dispense heads 102. An example dispense cassette 106 can include multiple microfluidic dispense heads 102 arranged in parallel across the length of the cassette 106. Different dispense cassettes 106 can include different types of microfluidic dispense heads 102, as described below with reference to FIGS. 2 and 3, for example. The types of microfluidic dispense heads 102 that may be integrated onto a dispense cassette 106 can be identified by the fluid dispensing device 100 through a cassette reader 107 that can read a cassette identifier 109 on the cassette 106. A cassette identifier 109 can include, for example, a label with a machine-readable bar code, a quick response (QR) code, or some other type of code that is readable by cassette reader 107. The cassette identifier 109 and cassette reader 107 enable identification of the cassette 106 to the fluid dispensing device 100, for example, in order to assign a particular assay protocol and/or a particular vibration protocol to the cassette, as further described below.

Figure 2:
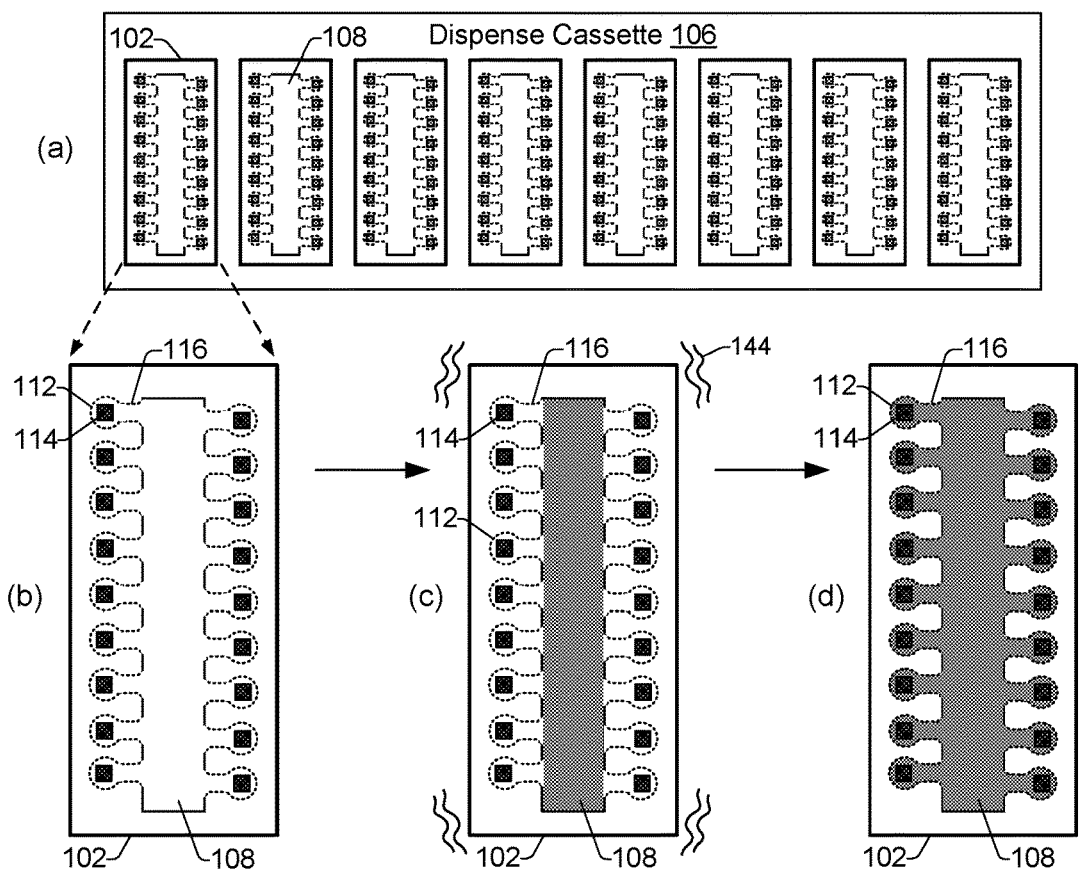
FIG. 2 shows an example of a dispense cassette that includes multiple microfluidic dispense heads suitable for use in a fluid dispensing device.

FIG. 2 shows an example of a dispense cassette 106 that includes eight microfluidic dispense heads 102 suitable for use in a fluid dispensing device 100 as shown in FIG. 1. Each microfluidic dispense head 102 comprises a fluid supply slot 108 into which fluid can be added for dispensing through nozzles 110. In different examples, a microfluidic dispense head 102 can implement different ejection technologies to dispense fluid drops.

For example, in a thermal drop-on-demand ejection process, a microfluidic dispense head 102 can include a series of dispense chambers 112, each chamber containing a resistive heating element 114, and each chamber being associated with a corresponding ejection nozzle 108. Each dispense chamber 112 can be in fluidic communication with the fluid supply slot 108 via a microfluidic channel 116. A fluid drop can be dispensed or ejected from a chamber 112 by passing a current through the resistive heating element 114. The current heats the resistive element 114, causing rapid vaporization of fluid around the element and forming a vapor bubble that generates a pressure increase that ejects a fluid drop out of the chamber through the nozzle 108.

In a piezoelectric drop-on-demand fluid ejection process, a microfluidic dispense head 102 can include a piezoelectric material associated with each chamber 112. The piezoelectric material changes shape when a voltage is applied, and the change in shape generates a pressure pulse in the fluid within the chamber 112 that forces a drop of fluid out of the chamber through the nozzle 108. A dispense head 102 and its various components and structures can be manufactured using assorted microfabrication techniques including microlithography, thin film construction, etching, bonding, and so on.

As shown in FIG. 1, an example fluid dispensing device 100 can include a well plate 118 that includes numerous wells 120 into which fluid drops can be dispensed from the microfluidic dispense heads 102 of a dispense cassette 106. A well plate transport assembly 122 can position and reposition the well plate 118 and wells 120 relative to the dispense heads 102 as fluid droplets are being dispensed. Thus, a fluid dispense zone 124 is defined adjacent to the nozzles 110 in an area between the dispense heads 102 and the wells 120 on the well plate 118.

Referring still to FIG. 1, the example fluid dispensing device 100 also includes an example controller 126. The controller 126 can control various operations of the fluid dispensing device 100 to facilitate, for example, the vibrational priming of microfluidic dispense heads 102 and the dispensing of fluid drops from microfluidic dispense heads 102. As shown in FIG. 1, an example controller 126 can include a processor (CPU) 128 and a memory 130. The controller 126 may additionally include other electronics (not shown) for communicating with and controlling various components of the fluid dispensing device 100. Such other electronics can include, for example, discrete electronic components and/or an ASIC (application specific integrated circuit). Memory 130 can include both volatile (i.e., RAM) and nonvolatile memory components (e.g., ROM, hard disk, optical disc, CD-ROM, magnetic tape, flash memory, etc.). The components of memory 130 comprise non-transitory, machine-readable (e.g., computer/processor-readable) media that can provide for the storage of machine-readable coded program instructions, data structures, program instruction modules, JDF (job definition format), and other data and/or instructions executable by a processor 128 of the fluid dispensing device 100.

An example of executable instructions to be stored in memory 130 include instructions associated with a dispense control module 132, a dispense protocol module 134, a vibration protocol module 136, and a dispense cassette identifier module 138. In general, modules 132, 134, 136, and 138 include programming instructions and or data executable by processor 130 to cause the fluid dispensing device 100 to perform operations related to dispensing fluid from microfluidic dispense heads 102 on a dispense cassette 106 into wells 120 on the well plate 118. Such operations can include, for example, the operations of methods 500 and 600, described below with respect to FIGS. 5 and 6, respectively.

In some examples, instructions in dispense control module 132 are executable to enable the controller 126 to send prompts to, and receive information from, a user through user interface (UI) 140. A fluid dispensing session can begin, for example, with a user inserting a dispense cassette 106 into the receiving station 104 according to a controller prompt through the UI 140. Upon insertion of the cassette 106, the controller can prompt a user to provide fluid to the fluid supply slots 108 of the microfluidic dispense heads 102, or the fluid can be provided according to a dispense protocol as noted below. Upon insertion of the cassette 106, the controller 126 can initiate the execution of instructions from the dispense cassette identifier 138, which can execute to cause the cassette reader 107 to read the cassette identifier 109. When the cassette identifier 109 has been read, instructions from the dispense protocol module 134 can execute to assign a dispense protocol to the inserted cassette 106. A number of dispense protocols can be stored in the dispense protocol module 134 and can be associated therein with different types of dispense cassettes 106. Dispense protocols can define, for example, particular nozzles 110 on particular dispense heads 102 that are to dispense fluid drops into particular wells 120 in the well plate 118. Dispense protocols can also define the number of drops to be dispensed, the volume of the drops, and so on. Dispense protocols can also define how the well plate 118 is to be moved relative to a fluid dispense cassette 106 so that each fluid can be dispensed to different wells 120. In some examples, dispense protocols can indicate the type of fluid to be provided in fluid supply slots 108 of the microfluidic dispense heads 102.

Furthermore, when the cassette identifier 109 has been read, instruction from the vibration protocol module 136 can execute to assign a vibration protocol to the inserted cassette 106. A number of vibration protocols can be stored in the vibration protocol module 136 and associated therein with different types of dispense cassettes 106. Vibration protocols can define vibration parameters to be applied by a vibration engine 142 to the inserted cassette 106 just prior to beginning the dispense protocol in order to move fluid from the fluid supply slots 108 of the microfluidic dispense heads 102 into the chambers 112 through microfluidic channels 116 of the dispense heads 102. Examples of vibration engines 142 can include an eccentric rotating mass vibration motor (ERM) that uses a small unbalanced mass on a DC motor to cause vibrations upon rotation of the motor, and a linear resonant actuator (LRA) that contains a small internal mass attached to a spring that creates a vibrational force when driven.

Vibration parameters can include, for example, vibration frequencies, vibration amplitudes, and vibration direction. For example, depending on the type of cassette 106, vibration frequencies may include frequencies within a range of about 100 Hz to about 300 Hz, and vibration amplitudes may include amplitudes within a range of about 1.0 G (acceleration, 9.8 meters/second$^2$) to about 4.0 G. Other frequencies and amplitudes are also possible and contemplated herein. The vibration direction can include directions that are from left to right and right to left, front to back and back to front, up and down, combinations thereof, and so on.

Figure 3:
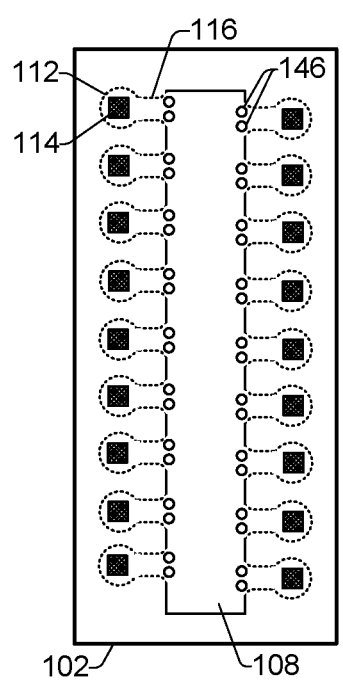
FIG. 3 shows an example of a microfluidic dispense head that includes particle filtration structures near the fluid entry point of each microchannel.
Figure 4:
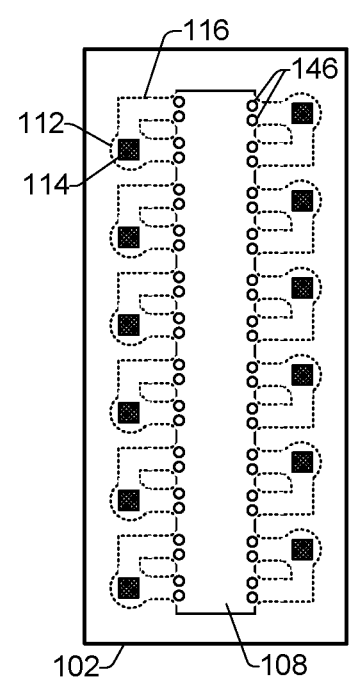
FIG. 4 shows an example of a microfluidic dispense head that has particle filtration structures as well as different microchannel geometries.

As noted above, an example dispense cassette 106 can include varying types of microfluidic dispense heads 102, and the controller 126 can identify the type of dispense head and implement a vibration protocol and dispense protocol associated with the type of dispense head. FIGS. 2, 3, and 4, show examples of several different types of microfluidic dispense heads 102. Variations in the types of dispense heads 102 can include varying microchannel geometries, the presence or absence of particle filtration structures, combinations thereof, and so on. As shown in FIG. 2, the geometry of the microchannels 116 disposed between the fluid supply slot 108 and respective fluid chambers 112 is mostly straight. Such geometry may mean that a vibration protocol associated with the dispense head 102 of FIG. 2 has a relatively low vibration frequency and relatively low vibration amplitude due to the ease with which the microchannels 116 and chambers 112 might be primed with fluid. As shown in FIG. 2, an example of a microfluidic dispense head 102 from dispense cassette 106 (part (a)) is illustrated before fluid has been provided in the fluid supply slot (part (b)), after fluid has been provided in the fluid supply slot 108 (part (c)), and after a vibration protocol (indicated by vibrational lines 144) has been applied. As indicated in part (c), when fluid is provided in the fluid supply slot 108, it tends to remain in the slot and not to spread throughout the microchannels 116 and into the chambers 112 due to fluid surface tensions, wettability characteristics and so on. As indicated in part (d), when the vibration is applied by vibration engine As shown in FIG. 3, particle filtration structures 146 are included near the fluid entry point of each microchannel 116 at the edge of the supply slot 108. Such particle filtration structures 146 can help to filter out particles larger than a particular size that are not intended to pass through the microchannels 116 and into the chambers 112. However, such structures 146 can alter the manner in which fluid from the supply slot 108 enters the microchannels 116 and moves into the chambers 112. The variation in microstructures within the microfluidic dispense head 102 in FIG. 3 and FIG. 2 can mean that a vibration protocol associated with the dispense head 102 of FIG. 3 will be different than a vibration protocol associated with the dispense head 102 of FIG. 2. For example, a vibration protocol for the dispense head 102 of FIG. 3 may have a higher vibration frequency and higher vibration amplitude, and/or a different vibration direction. FIG. 4 shows another example of a microfluidic dispense head 102 that has both the particle filtration structures 146 shown in FIG. 3, as well as different microchannel geometries than are shown in FIGS. 2 and 3. The microchannel geometry shown in the dispense head 102 of FIG. 4 provides a channel loop that begins and ends at the fluid supply slot. Particle filtration structures 146 are present near both fluid entry points of each microchannel 116 in the dispense head 102 of FIG. 4.

Figure 5:
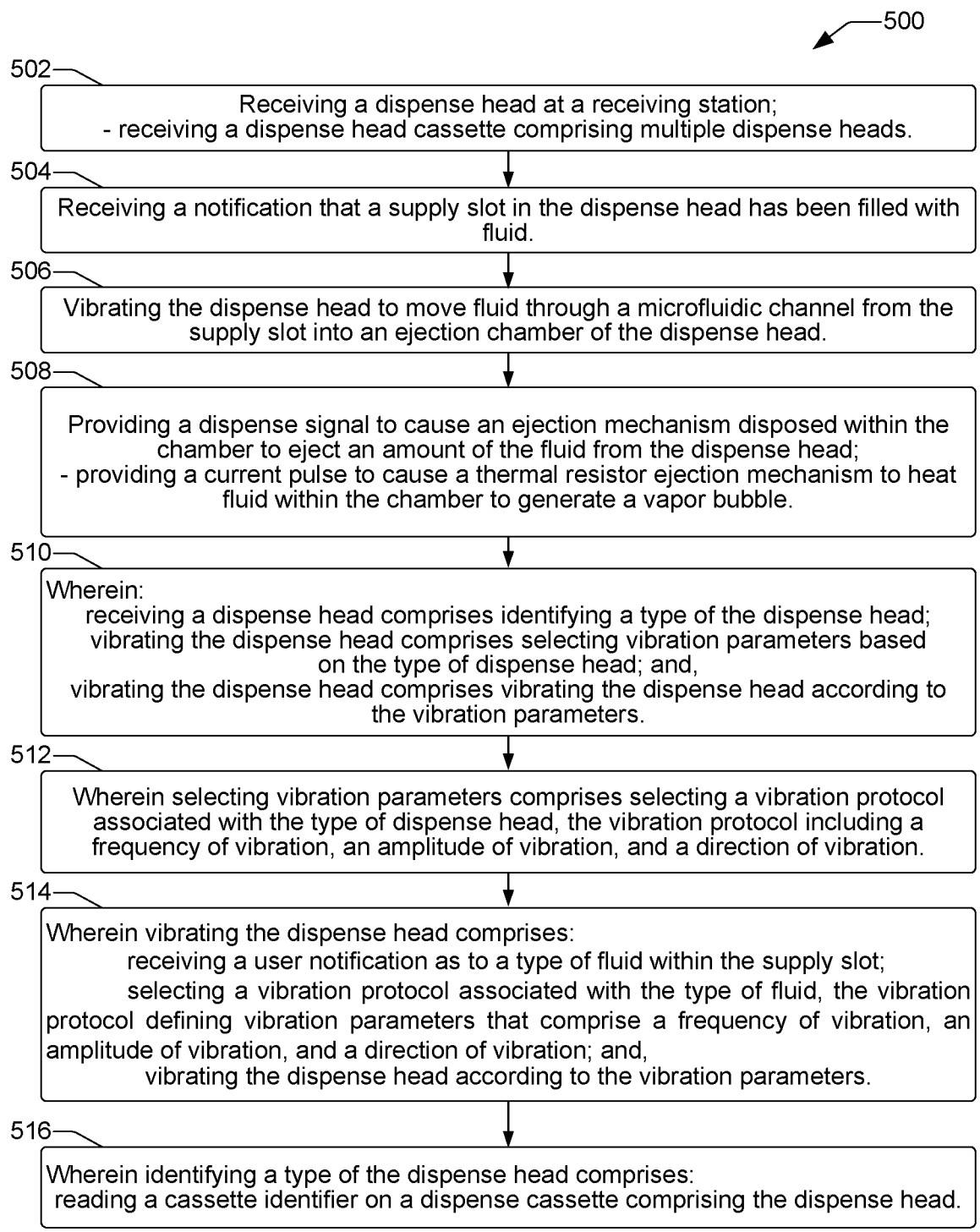
FIGS. 5 and 6 are flow diagrams showing example methods of dispensing fluid from a fluid dispensing device.
Figure 6:
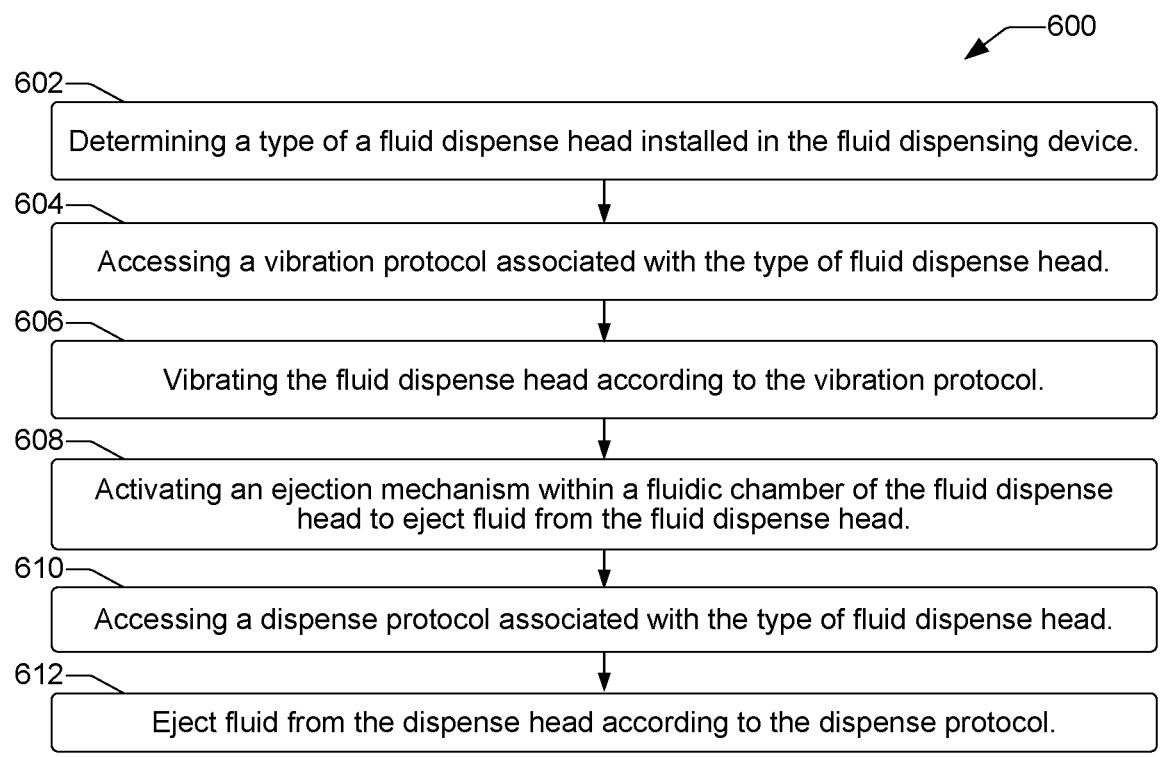

FIGS. 5 and 6 are flow diagrams showing example methods 500 and 600, of dispensing fluid from a fluid dispensing device. Methods 500 and 600 are associated with examples discussed above with regard to FIGS. 1-4, and details of the operations shown in methods 500 and 600 can be found in the related discussion of such examples. The operations of methods 500 and 600 may be embodied as programming instructions stored on a non-transitory, machine-readable (e.g., computer/processor-readable) medium, such as memory 130 shown in FIG. 1. In some examples, implementing the operations of methods 500 and 600 can be achieved by a processor, such as a processor 128 of FIG. 1, reading and executing the programming instructions stored in a memory 130. In some examples, implementing the operations of methods 500 and 600 can be achieved using an ASIC and/or other hardware components alone or in combination with programming instructions executable by a processor 128.

The methods 500 and 600 may include more than one implementation, and different implementations of methods 500 and 600 may not employ every operation presented in the respective flow diagrams of FIGS. 5 and 6. Therefore, while the operations of methods 500 and 600 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing one or more subsequent operations, while another implementation of method 800 might be achieved through the performance of all of the operations.

Referring now to the flow diagram of FIG. 5, an example method 500 of dispensing fluid from a fluid dispensing device begins at block 502 with receiving a dispense head at a receiving station. In some examples, receiving a dispense head includes receiving a cassette having multiple dispense heads. As shown at block 504, the method includes receiving a notification that a supply slot in the dispense head has been filled with fluid. In some examples, a notification can be received from a user through a user interface following a prompt from the fluid dispensing device. As shown at block 506, the method includes vibrating the dispense head to move fluid through a microfluidic channel from the supply slot into an ejection chamber of the dispense head. After vibrating the dispense head, a dispense signal can be provided to cause an ejection mechanism disposed within the chamber to eject an amount of the fluid from the dispense head, as shown at block 508. In some examples, providing a dispense signal can include providing a current pulse to cause a thermal resistor ejection mechanism to heat fluid within the chamber to generate a vapor bubble.

As shown at block 510, in some examples receiving a dispense head includes identifying a type of the dispense head, and vibrating the dispense head includes selecting vibration parameters based on the type of dispense head. Vibrating the dispense head can then include vibrating the dispense head according to the vibration parameters. As shown at block 512, selecting vibration parameters can include selecting a vibration protocol associated with the type of dispense head. In some examples, the vibration protocol includes a frequency of vibration, an amplitude of vibration, and a direction of vibration.

As shown at block 514, in some examples vibrating the dispense head includes receiving a user notification as to a type of fluid within the supply slot, and selecting a vibration protocol that is associated with the type of fluid. The vibration protocol can define vibration parameters that include a frequency of vibration, an amplitude of vibration, and a direction of vibration. The dispense head can be vibrated according to the vibration parameters.

As shown at block 516, in some examples identifying a type of the dispense head includes reading a cassette identifier on a dispense cassette that includes the dispense head.

Referring now to FIG. 6, an example method 600 of dispensing fluid from a fluid dispensing device begins at block 602 with determining a type of a fluid dispense head installed in the fluid dispensing device. As shown at block 604, the method can continue with accessing a vibration protocol associated with the type of fluid dispense head. The fluid dispense head can then be vibrated according to the vibration protocol, and an ejection mechanism can be activated within a fluidic chamber of the fluid dispense head to eject fluid from the fluid dispense head, as shown at blocks 606 and 608, respectively. In some examples, as shown at block 610, the method 600 can include accessing a dispense protocol associated with the type of fluid dispense head. Fluid can then be dispensed from the dispense head according to the dispense protocol, as shown at block 612.

What is claimed is:

1. A method of dispensing fluid from a fluid dispensing device, comprising:
   receiving a dispense head at a receiving station;
   receiving a notification that a supply slot in the dispense head has been filled with fluid;
   receiving a user notification as to a type of fluid within the supply slot;
   selecting a vibration parameter associated with the type of fluid within the supply slot;
   vibrating the dispense head to move fluid through a microfluidic channel from the supply slot into an ejection chamber of the dispense head, the vibrating performed according to the vibration parameter; and,
   after vibrating the dispense head, providing a dispense signal to cause an ejection mechanism disposed within the ejection chamber to eject an amount of the fluid from the dispense head, wherein the vibrating of the dispense head followed by providing the dispense signal initiates flow of the fluid from the supply slot through the microfluidic channel and into the ejection chamber followed by ejection of the fluid from the ejection chamber through a nozzle of the dispense head.

2. A method as in claim 1, wherein:
   receiving the dispense head comprises identifying a type of the dispense head; and,
   vibrating the dispense head comprises selecting a plurality of vibration parameters including the vibration parameter based on the type of dispense head, and vibrating the dispense head according to the vibration parameters determined for the type of fluid and the type of dispense head.

3. A method as in claim 2, wherein selecting the plurality of vibration parameters comprises selecting a vibration protocol associated with the type of dispense head, the vibration protocol including a frequency of vibration, an amplitude of vibration, and a direction of vibration.

4. A method as in claim 1, wherein vibrating the dispense head comprises:
   selecting a vibration protocol associated with the type of fluid, the vibration protocol defining a plurality of vibration parameters including the vibration parameter, wherein the plurality of vibration parameters comprise a frequency of vibration, an amplitude of vibration, and a direction of vibration; and,
   vibrating the dispense head according to the plurality of vibration parameters.

5. A method as in claim 1, wherein receiving the dispense head comprises receiving a dispense head cassette comprising multiple dispense heads.

6. A method as in claim 2, wherein identifying a type of the dispense head comprises:
   reading a cassette identifier on a dispense cassette comprising the dispense head.

7. A method as in claim 1, wherein providing the dispense signal comprises providing a current pulse to cause a thermal resistor ejection mechanism to heat fluid within the chamber to generate a vapor bubble.

8. A fluid dispensing device comprising:
   a receiving station to receive a dispense head;
   the dispense head in the receiving station, the dispense head comprising a supply slot to receive fluid, an ejection mechanism to eject drops of the fluid from a chamber through a nozzle, and a microfluidic channel providing fluid communication between the slot and the chamber;
   a vibration device to vibrate the dispense head in the receiving station causing fluid to move from the supply slot into the chamber through the microfluidic channel, wherein the vibration device is to vibrate the dispense head according to a vibration parameter determined from a user-provided indication of a type of the fluid; and
   a processor programmed to:
      determine the vibration parameter associated with the type of fluid;
      activate the vibration device to control the vibration device to vibrate the dispense head according to the vibration parameter; and
      after the activation of the vibration device, provide a dispense signal to the dispense head to control the dispense head to eject the drops of fluid through the nozzle, wherein the activation of the vibration device and the control of the dispense head initiates flow of the fluid from the supply slot through the microfluidic channel into the chamber and from the chamber through the nozzle of the dispense head.

9. A device as in claim 8, wherein the ejection mechanism is selected from the group consisting of a thermal resistor and a piezoelectric membrane.

10. A device as in claim 8, wherein the vibration device is selected from the group consisting of an eccentric rotating mass vibration motor and a linear resonant actuator.

11. A device as in claim 8, further comprising a cassette reader to read a cassette identifier to determine a type of the dispense head.

12. A device as in claim 11, further comprising:
a plurality of wells disposed on a well plate to receive fluid drops ejected from the dispense head; and
a well plate transport assembly to position the well plate with respect to the dispense head during ejection of fluid drops from the dispense head.

13. A device as in claim 12, wherein the processor is further programmed to determine, based on the type of dispense head:
a vibration protocol with which to control the vibration device to vibrate the dispense head prior to the ejection of fluid drops, the vibration protocol being associated with the type of fluid and defining the vibration parameter; and,
a dispense protocol with which to control the dispense head and the well plate transport assembly during the ejection of fluid drops.

14. A non-transitory machine-readable storage medium storing instructions that when executed by a processor of a fluid dispensing device cause the device to:
determine a type of a fluid dispense head installed in the fluid dispensing device, the fluid dispense head comprising a supply slot to receive a fluid, an ejection mechanism to eject drops of the fluid from a fluidic chamber through a nozzle, and a microfluidic channel providing fluid communication between the supply slot and the fluidic chamber;
receive a user-provided indication of a type of the fluid to be ejected by the fluid dispense head;
access a vibration protocol associated with the type of the fluid dispense head and the type of the fluid;
activate a vibration device to vibrate the fluid dispense head according to the vibration protocol; and
after the activation of the vibration device, activate the ejection mechanism within the fluidic chamber of the fluid dispense head to eject the fluid from the fluid dispense head, wherein the activation of the vibration device and activation of the ejection mechanism initiates flow of the fluid from the supply slot through the microfluidic channel into the fluidic chamber and from the fluidic chamber through the nozzle of the fluid dispense head.

15. A medium as in claim 14, the instructions further causing the device to:
access a dispense protocol associated with the type of fluid dispense head; and,
eject the fluid from the dispense head according to the dispense protocol.

16. A device as in claim 8, wherein the processor is further programmed to activate the vibration head and cause the vibration device to vibrate at a frequency of between 100 hertz (Hz) to 300 Hz.

17. A device as in claim 8, wherein the processor is further programmed to:
determine a type of dispense head that is in the receiving station;
select the vibration parameter based on the type of the fluid and the type of dispense head;
activate the vibration device to vibrate the dispense head according to the vibration parameter; and
activate the ejection mechanism to eject the fluid from the fluid dispense head in coordination with the vibration of the dispense head, wherein the activation of the ejection mechanism is after the activation of the vibration device and initiates controlled flow of the fluid from the supply slot into the microfluidic channel and to the chamber via the vibration of the dispense head, followed by the ejection from the chamber of dispense head out of the nozzle via the ejection mechanism.

18. A device as in claim 8, further including a non-transitory machine-readable storage medium storing instructions, wherein the processor is further programmed to execute the instructions to activate the ejection mechanism after the vibration of the fluid dispense head to initiate and coordinate the flow of the fluid from the supply slot into the chamber through the microfluidic channel and out of the nozzle.

19. A device as in claim 18, wherein the processor is further programmed to provide the dispense signal to the ejection mechanism to active the ejection mechanism and, in response, to cause the ejection of the drops of fluid, the ejection mechanism being activated after the vibration of the vibration device.

20. A device as in 8, wherein the processor is further programmed to active the vibration device to vibrate the dispense head according to a vibration protocol including a plurality of vibration parameters, the plurality of vibration parameters including the vibration parameter, wherein the plurality of vibration parameters include a vibration frequency, a vibration amplitude, and a vibration direction.

* * * * *